United States Patent
Dawson et al.

(10) Patent No.: US 8,214,433 B2
(45) Date of Patent: Jul. 3, 2012

(54) SYSTEM AND METHOD TO PROVIDE CONTEXT FOR AN AUTOMATED AGENT TO SERVICE MULTIPLE AVATARS WITHIN A VIRTUAL UNIVERSE

(75) Inventors: Christopher J. Dawson, Arlington, VA (US); Michael J. Osias, Westtown, NY (US); Brian W. Sledge, Shreveport, LA (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/334,866

(22) Filed: Dec. 15, 2008

(65) Prior Publication Data

US 2010/0153499 A1     Jun. 17, 2010

(51) Int. Cl.
  *G06F 15/16* (2006.01)
(52) U.S. Cl. ........ 709/204; 709/207; 709/217; 709/228; 705/14.4; 705/14.73; 345/419
(58) Field of Classification Search .......... 709/204–207; 345/419; 705/14.4–14.73
See application file for complete search history.

(56) References Cited

U.S. PATENT DOCUMENTS

| | | | |
|---|---|---|---|
| 6,393,461 B1 * | 5/2002 | Okada et al. ................... 709/204 |
| 6,421,047 B1 * | 7/2002 | de Groot ....................... 345/419 |
| 6,804,333 B1 * | 10/2004 | Liu et al. ..................... 379/88.17 |
| 7,036,128 B1 | 4/2006 | Julia et al. |
| 7,073,129 B1 | 7/2006 | Robarts et al. |
| 7,260,605 B1 * | 8/2007 | Okada et al. ................... 709/206 |
| 7,293,169 B1 * | 11/2007 | Righi et al. ......................... 713/2 |
| 7,774,388 B1 * | 8/2010 | Runchey ........................ 707/811 |
| 7,901,288 B2 * | 3/2011 | Barsness et al. ................. 463/30 |
| 8,046,408 B2 * | 10/2011 | Torabi ............................ 709/204 |
| 8,051,462 B2 * | 11/2011 | Hamilton et al. ................. 726/2 |
| 2002/0073154 A1 * | 6/2002 | Murakami et al. ............ 709/205 |
| 2002/0087704 A1 * | 7/2002 | Chesnais et al. ............... 709/228 |
| 2002/0113809 A1 * | 8/2002 | Akazawa et al. .............. 345/706 |
| 2005/0179685 A1 * | 8/2005 | Kake et al. ..................... 345/419 |
| 2006/0099933 A1 * | 5/2006 | Benveniste ................ 455/412.1 |
| 2007/0073582 A1 * | 3/2007 | Jung et al. ........................ 705/14 |
| 2007/0074114 A1 | 3/2007 | Adjali et al. |
| 2007/0192413 A1 * | 8/2007 | Murakami et al. ............ 709/204 |
| 2008/0177994 A1 * | 7/2008 | Mayer ................................ 713/2 |
| 2008/0204450 A1 * | 8/2008 | Dawson et al. ................ 345/419 |
| 2008/0207327 A1 * | 8/2008 | Van Luchene et al. .......... 463/42 |
| 2008/0262911 A1 * | 10/2008 | Altberg et al. ................... 705/14 |

(Continued)

OTHER PUBLICATIONS

Vilhjalmsson et al., "BodyChat: Autonomous Communicative Behaviors in Avatars", Autonomous Agents, 1998, pp. 269-276.*

(Continued)

*Primary Examiner* — Wing Chan
*Assistant Examiner* — Razu Miah
(74) *Attorney, Agent, or Firm* — William Schiesser; Roberts Mlotkowski Safran & Cole, P.C.

(57) ABSTRACT

A system and method to interact with business systems through the use of automated agents and provide context for an automated agent to service multiple avatars within a virtual universe. The system comprises a chat engine, a communications subsystem, and a channelizer configured to mediate one or more communications between the chat engine and the communications subsystem. The channelizer is further configured to map at least one channel to an application.

22 Claims, 3 Drawing Sheets

U.S. PATENT DOCUMENTS

| | | | |
|---|---|---|---|
| 2008/0263446 A1* | 10/2008 | Altberg et al. | 715/706 |
| 2008/0263458 A1* | 10/2008 | Altberg et al. | 715/757 |
| 2008/0263460 A1* | 10/2008 | Altberg et al. | 715/757 |
| 2009/0017916 A1* | 1/2009 | Blanchard et al. | 463/42 |
| 2009/0058862 A1* | 3/2009 | Finn et al. | 345/473 |
| 2009/0112906 A1* | 4/2009 | Shuster | 707/102 |
| 2009/0128567 A1* | 5/2009 | Shuster et al. | 345/473 |
| 2009/0141023 A1* | 6/2009 | Shuster | 345/419 |
| 2009/0193092 A1* | 7/2009 | Li | 709/206 |
| 2009/0201299 A1* | 8/2009 | Bhogal et al. | 345/474 |
| 2009/0325138 A1* | 12/2009 | Shuster | 434/350 |
| 2010/0115426 A1* | 5/2010 | Liu et al. | 715/757 |

OTHER PUBLICATIONS

Barrientos et al., "Cursive: Controlling Expressive Avatar Gesture Using Pen Gesture", CVE '02, Sep. 30-Oct. 2, 2002, pp. 113-119.

Vilhjálmsson et al., "BodyChat: Autonomous Communicative Behaviors in Avatars", Autonomous Agents, 1998, pp. 269-276.

Gillies et al., "Integrating Autonomous Behavior and User Control for Believable Agents", AAMAS '04, Jul. 19-23, 2004, pp. 336-343.

Traum et al., "Embodied Agents for Multi-party Dialog in Immersive Virtual Worlds", AAMAS '02, Jul. 15-19, 2002, pp. 766-773.

* cited by examiner

SYSTEM AND METHOD TO PROVIDE CONTEXT FOR AN AUTOMATED AGENT TO SERVICE MULTIPLE AVATARS WITHIN A VIRTUAL UNIVERSE

FIELD OF THE INVENTION

The invention generally relates to a system and method for interacting with business systems through the use of automated agents and, in particular, to providing context for an automated agent to service multiple avatars within a virtual universe.

BACKGROUND OF THE INVENTION

A virtual universe (VU) is an interactive simulated environment accessed by multiple users through an online interface. Users inhabit and interact in the VU via avatars, which are a user's representation of himself or herself. Typically avatars can be representative of a human user, however, avatars may be used to represent any number of entities. These representations can be in the form of a three-dimensional model, a two-dimensional icon, a text construct, a user screen name, etc. Although there are many different types of VUs, there are several features many VUs generally have in common. These features include, for example, Shared Space: the VU allows many users to participate at once;
Graphical User Interface: the VU depicts space visually, ranging in style from 2D "cartoon" imagery to more immersive 3D environments;
Immediacy: interaction takes place in real time;
Interactivity: the VU allows users to alter, develop, build, or submit customized content. Interactivity may also include the ability to move and to touch and/or manipulate an object in the VU;
Persistence: the VU's existence continues regardless of whether individual users are logged in;
Socialization/Community: the VU allows and encourages the formation of social groups such as teams, guilds, clubs, cliques, housemates, neighborhoods, etc.; and
Communication: the VU allows users to speak in a natural language and be detected by other users within a proximity radius by using proximity based chat.

With the proliferation of VUs and 3D Internet, the number of ways that avatars can interact with one another has increased. Now, instead of being limited to communication between one or more users, users have the opportunity to interact with automated machine driven avatars. Automated avatars may be used for a number of purposes such as, e.g., hospitality greeters, sales, service, etc.

Automated avatars may be instructed to interact the same way with all users' avatars. For example, a hospitality greeter may be programmed to automatically say hello to every avatar that comes within a predefined proximity of the hospitality greeter. Similarly, a sales avatar may be programmed to automatically initiate a one on one conversation with an avatar that is chatting within a predefined radius of the sales avatar. While this provides some level of automated interaction, the type of interaction is generic and does not engage the user of the avatar.

SUMMARY OF THE INVENTION

In a first aspect of the invention, a system comprises a chat engine, a communications subsystem, and a channelizer configured to mediate one or more communications between the chat engine and the communications subsystem, the channelizer further configured to map at least one channel to an application.

In another aspect of the invention, a computer implemented method comprises receiving a communication from an avatar over a chat framework and checking whether the communication is a new communication or a preexisting communication. The computer implemented method further comprise mapping the communication to a channel and transmitting a response to the communication over the chat framework, wherein the response maintains a context of the communication.

In another aspect of the invention, a computer program product comprising a computer usable storage medium having readable program code embodied in the storage medium is provided. The computer program product includes at least one component operable to: identify an incoming communication; map the incoming communication to a channel; send the incoming communication to an application program interface; and receive a communication from the application program interface, wherein the communication is a response in a context of the incoming communication.

In yet another aspect of the invention, a method for providing context for interactions, comprises providing a computer infrastructure being operable to: identify an incoming communication; map the incoming communication to a channel; send the incoming communication to an application program interface; and receive a response from the application program interface, wherein the response is in a context of the incoming communication.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention is directed to a system and method for interacting with business systems through the use of automated agents and, in particular, to providing context for an automated agent to service multiple avatars within a virtual universe. More specifically, the invention describes a system and method to interact with business systems through the use of automated avatars.

Artificially intelligent automated avatars ("automated avatars") may be used to perform a number of functions in a VU. For example, automated avatars may be used to answer questions, trouble shoot problems, sell products in a VU, etc. In embodiments, automated avatars may be connected to a back end system such as an email or artificially intelligent chat program. These programs may be used to instruct automated avatars on what to say in order to carry on individual natural language conversations with user avatars and/or other automated avatars.

The present invention allows a single automated avatar to carry on natural language conversations with a plurality of user avatars or automated avatars at one time, i.e., the present invention is scalable. Moreover, in addition to being scalable, the present invention allows the context of each communication to be maintained by using a multi threaded application, to which the user avatars and/or automated avatars may be connected. This beneficially reduces the number of automated avatars that are needed to maintain coherent interactions with a plurality of avatars. Additionally, this also advantageously reduces the number of automated avatars that need to be located within a given region to interact with user avatars and/or automated avatars.

The present invention maintains the context of one or more communications by assigning a separate chat channel to each communication or logical group of communications. This is accomplished, in part, by sending an avatar's communication to an automated avatar via a chat engine. Once received, the automated avatar can determine whether the communication is part of a pre-existing communication, such as a conversation. This determination may be performed using a component that is configured to match information associated with the incoming communication to information about previous communications, which may be stored in a lookup table. If a match occurs, the incoming communication is mapped or otherwise associated with the matching entry in the lookup table. However, if a match does not occur, the incoming communication is mapped to a new channel and information relating to the communication and/or avatar can be stored in the lookup table.

Once the incoming communication is mapped or otherwise associated with a channel, the communication and information associated with the communication may be sent to an artificially intelligent application, such as an Application Program Interface (API). In embodiments, a number of instances of the application may be created such that an individual instance may be associated with each communication or a manageable group of communications via a channel. By associating a channel to a communication as well as to an instance of an application, the invention allows the application to generate a response that maintains the context of the communication. This response may be sent from the automated avatar and to the user's avatar and/or automated avatar via the designated channel, thereby facilitating communication between the avatar and the automated avatar.

Accordingly, the present invention allows a single automated avatar to communicate with a plurality of avatars while maintaining the context of each communication. This increases user experiences in the VU and also requires fewer resources than traditional automated avatar programs because, e.g., the present invention does not require a separate automated avatar to be created for each avatar. Thus, resources consumed in creating the automated avatar and running the back end programs for each automated avatar may be preserved. Moreover, by centralizing the communications infrastructure and logic, the maintenance and development of applications that use an avatar as a user API may be simplified.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
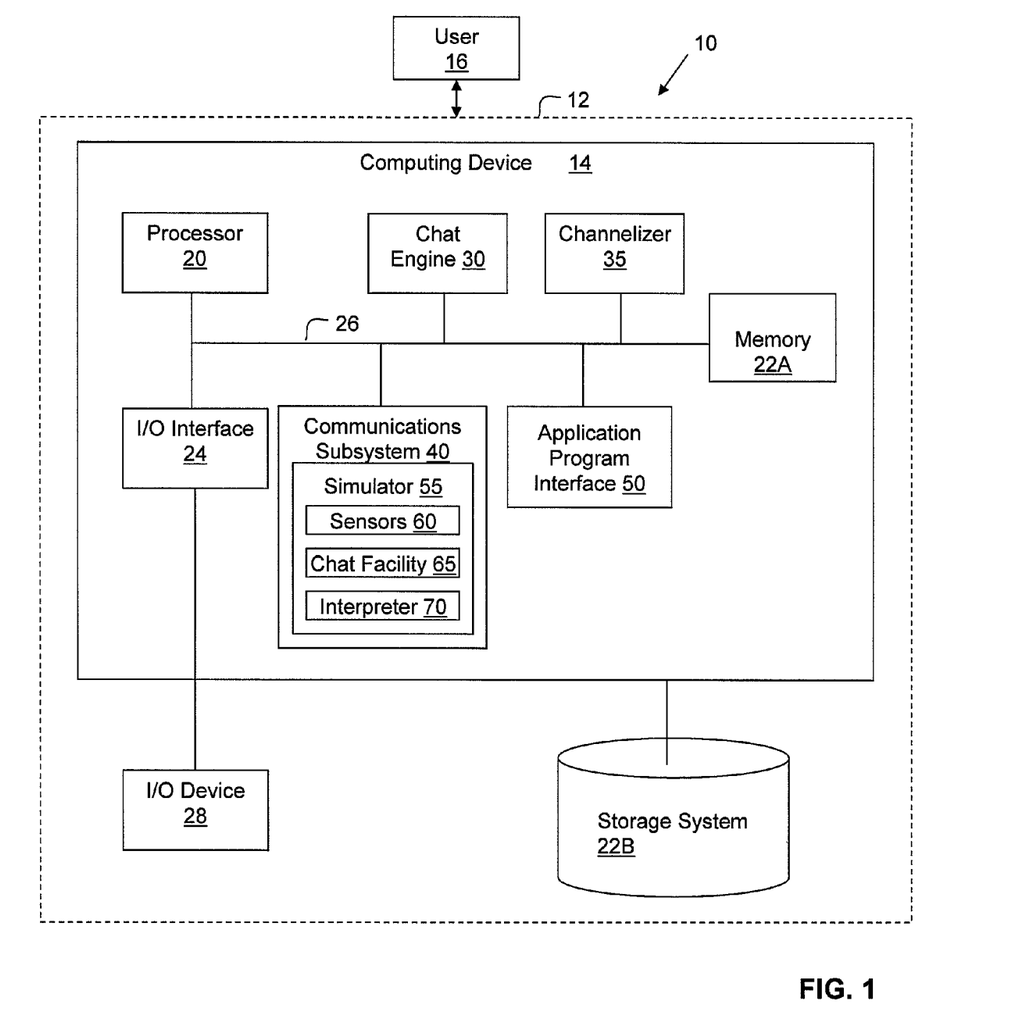
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a Chat Engine 30, a Channelizer 35, a Communications Subsystem 40, and an Application Program Interface (API) 50. The Chat Engine 30, the Channelizer 35, the Communications Subsystem 40, and the API 50 are configured to make computing device 14 operable to provide context for interactions between users and automated agents in accordance with the invention, e.g., process described herein.

More specifically, the Chat Engine 30 is configured to provide a framework that facilitates communications, e.g., chats, between a plurality of user avatars and/or automated avatars. The Chat Engine 30 is further configured to interact with a plurality of components and/or systems such as the Communications Subsystem 40, the API 50, the Channelizer 35, etc., to provide context for interactions between, e.g., user avatars and automated agents. Any number of chat engines known to those of skill in the art may be used to provide a chat framework in accordance with the present invention.

The Channelizer 35, which may be embodied as part of an automated avatar, is configured to mediate communications between the Chat Engine 30 and the Communications Subsystem 40 by mapping chat channels to network API calls using keys and/or channels defined in a lookup table. In embodiments, the automated avatar may invoke an API 50 via the Communications Subsystem 40 over the Internet using an assigned key by passing the key with a network request over the Internet to an application. Embodiments may associate the key with one or more unique API 50 instances. The key may be predefined and/or loaded into a system memory table at runtime or configured dynamically.

More specifically, communications from a user's avatar or another automated avatar may be sent from the Chat Engine 30 to the Channelizer 35. Once obtained, the Channelizer 35 may map chat channels to network API calls using information in a lookup table, which includes, e.g., keys, channels, etc. This information may be sent from the Channelizer 35 to the Communications Subsystem 40 or from the Communications Subsystem 40 to the Channelizer 35, i.e., the Channelizer 35 can send and receive information. In embodiments, the relayed information may include a communication from a user's avatar and/or an automated avatar.

The Communications Subsystem 40 is configured to facilitate communication between an avatar and an automated avatar. More specifically, the Communications Subsystem 40 may be embodied as part of an automated avatar and may be used by the automated avatar to interface with user's avatars and/or other automated avatars within a VU. The Communications Subsystem 40 is also configured to send communications to one or more systems or components, and may be used to invoke the API 50.

In embodiments the Communications Subsystem 40 may comprise a number of components, including a Simulator 55, which allows the automated avatar to recognize the presence and/or speech of a user's avatar. The Simulator 55 may be embodied as a middleware component on a server and is configured to run one or more scripts and/or store data in a memory 22A. The one or more scripts may be used to, e.g., manage user states, monitor avatar positions, integrate data and/or graphics, provide miscellaneous services, etc. In embodiments, the scripts may be attached to a 3D object within the VU such as, e.g., a magic ring, an inventory item, etc. The 3D object may be attached to an avatar and give the avatar a behavior, as specified herein. One or more of the scripts may be executed by an Interpreter 70, which may be included as part of the Simulator 55.

The Simulator 55 may allow an automated avatar to recognize the presence and speech of a user's avatar by utilizing Sensors 60 and/or Chat Facilities 65, which may be embodied as components of the Simulator 55. More specifically, an automated avatar may use Sensors 60 to detect the presence of a user's avatar that is located within a predefined proximity of the automated avatar. In embodiments, the detection may be performed by directly sensing the avatar or an avatar's 3D object. Additionally, in embodiments, the detection may be performed by programming an avatar or an avatar's 3D object to directly interface with the automated avatar via the Communications Subsystem 40, without first being sensed by the Sensors 60.

Chat Facilities 65 are configured to facilitate communication between the automated avatars and the user's avatars. The Chat Facilities 65 may be provided by the Simulator 55 as part of a 3D simulator environment. In embodiments, the Chat Facilities 65 may be proximity based, channel based, or a combination thereof. Proximity based Chat Facilities 65 may be used to determine, e.g., what user avatars and/or automated avatars are within a specified spatial scope. The spatial scope may be representative of the distance a user avatar or automated avatar can be within while still being able to hear a communication, i.e., a chat.

Channel based Chat Facilities 65 may be used to determine what channel a communication, e.g., a chat, takes place on. For example, channel based Chat Facilities 65 may allow chats to occur on 65535 different channels. One or more of these channels may be public or non-public. Thus, for example, channel 1 may be represented as a public channel on which everyone can be heard; whereas other channels may be non-public channels on which a user avatar and/or an automated avatar can only be heard by those listening to the same channel. In embodiments, a group or range of channels may be logically grouped together for a specific purpose to create a channel bank. Channel banks may be used for, e.g., multiplexing and/or channelizing data.

An automated avatar may invoke the API 50 via the Communications Subsystem 40 over the Internet using an assigned key, which may be stored in the lookup table. In embodiments, the Communications Subsystem 40 may pass the key with a network request, such as a hypertext transfer protocol (HTTP) request, over the Internet to an API 50 or similar application. The API 50 may respond to the network request with an appropriate output result, which may be delivered back to the Communications Subsystem 40 over the same network. The response may include, e.g., a communication from the automated avatar in response to the communication from the user's avatar.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A and/or storage system 22B. The computer code may be representative of the functionality of the Chat Engine 30, the Channelizer 35, the Communications Subsystem 40, and the API 50. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
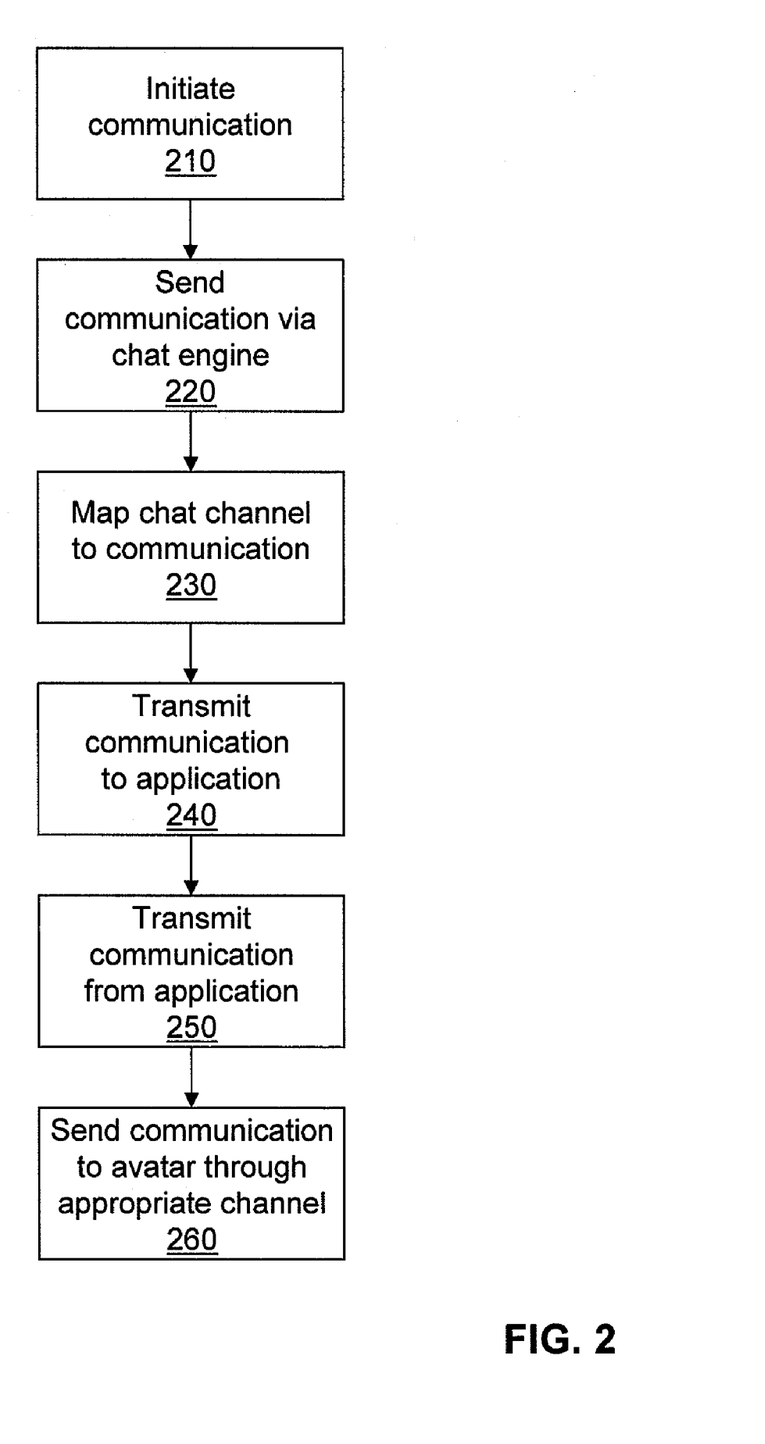
FIG. 2 shows a flow chart of an exemplary process in accordance with aspects of the invention.

The flowchart and block diagram in FIG. 2 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

FIG. 2 shows a flow chart of an exemplary process according to embodiments of the invention. At step 210, a communication may be initiated. The initiation may result from a user's avatar and/or an automated avatar. For example, a communication may be initiated by a user's avatar speaking to an automated avatar. Likewise, a communication may be initiated by an automated avatar speaking to a user's avatar. A communication may also be initiated from the happening of an event. Exemplary events may include, e.g., an avatar selecting a button or option to initiate a communication, an announcement being made that allows an avatar to respond, etc.

A communication may be initiated when the automated avatar detects an avatar and/or an object of the avatar's within a predetermined proximity. For example, an automated avatar at a virtual kiosk may detect avatars that come within a predefined distance of the virtual kiosk and initiate a communication, such as a greeting, to the avatar. Similarly, an automated avatar may detect communications between one or more avatars on an existing communication channel. For example, an automated avatar may detect one or more avatars speaking with one another on a public chat channel and initiate a communication with one or more of the avatars. It should be understood that a communication may be initiated between one avatar and/or a plurality of avatars at a time.

At step 220, the initiated communication may be sent to a chat engine or chat framework (such as the Chat Engine 30 in FIG. 1). The chat engine may provide a mechanism, such as a handler, to encode the communicated message into a request. In embodiments the request may be encoded as a HTTP request and sent to a channelizer as a package. The package may include, e.g., the communication from the user's avatar, a session identifier, etc.

The channelizer may receive the HTTP request and unpackage the HTTP request to parse out the information sent by the avatar via the chat engine. The channelizer may also perform a lookup to determine whether the received communication is part of an existing communication, i.e., a communication that has already been initiated between the avatar and the automated avatar. This may be performed, e.g., using a lookup table having columns for an avatar's name, the channel the communication with the avatar is taking place on, a key, the time and/or date that the last communication took place, etc. In embodiments, the key may be a hexadecimal string, such as a universally unique identifier (UUID), and may be used to uniquely identify an avatar and/or an avatar's object within the VU.

At step 230, a chat channel may be mapped onto a communication. In those instances where an existing communication between the avatar and the automated avatar already exists in the lookup table, the same chat channel may be used. However, in those instances where an existing communication has lapsed or a new communication is being initiated, a new chat channel may be mapped to the communication.

In embodiments, one or more entries in the lookup table may lapse. A lapse may occur, e.g., after a predetermined period of time has expired. Similarly, a lapse may occur when there exists no available chat channels and the communication is the oldest communication in the lookup table. The process of determining whether an entry, e.g., a communication, has lapsed may include, e.g., having an internal timer periodically check the current time against the time stored in the lookup table. In embodiments, the internal timer may be provided by the simulator runtime environment timer, which causes a routine inside of the automated agent script environment to be invoked to check the current time against one or more of the times stored in the table. If the amount of time that has passed between the last conversation in the lookup table and the current time is greater than some predefined value, the entry and the information associated with the entry may be cleared from the lookup table. Contrarily, if the amount of time that has passed between the last conversation in the lookup table and the current time is less than some predefined value, no action need be taken.

In embodiments, the mapping process may include identifying an available chat channel. This may be performed by identifying the first available chat channel, randomly selecting a chat channel from the available chat channels, etc. Once an available chat channel is identified, the channelizer may assign the chat channel to the avatar's communication. This may be performed by, e.g., associating the avatar's name with the chat channel and/or associating a key to the chat channel, wherein the key is unique to the avatar and/or an object of the avatar. At any point after the channelizer assigns a chat channel to the communication, the channelizer may communicate the chat channel to the avatar via the chat engine so that the avatar may use the assigned chat channel for future communications.

The present invention allows a plurality of avatars to be mapped to the same communication channel at one time, thereby allowing multiple avatars to participate in the same communication at the same time. In embodiments, one or more avatars may automatically be mapped to the same chat channel or may be mapped to the same chat channel upon an avatar's request. The request may include, e.g., an avatar passing a keyword to the automated avatar through the chat engine, wherein the keyword indicates that the avatar would like to join a specified channel or communication. In embodiments, the keyword may be a simple request message, a password, etc.

Upon mapping a communication to a chat channel, the unpackaged information may be sent to a communications subsystem (such as the communications subsystem 40 described in FIG. 1). The communications subsystem may package the communication, as well as additional information about the communication, as an HTTP request. At step 240, the package may be sent to an application, which may be embodied as an instance of an API (such as the API 50 described in FIG. 1). The number of API instances may vary between embodiments and include, e.g., an API instance for each chat channel.

One or more artificial intelligence algorithms may be associated with each of the API instances and used to determine what communication should be sent in response to the avatar's communication, which was transmitted with the HTTP request package. Once determined, the response may be packaged and transmitted from the API to the communications subsystem, at step 250. In embodiments, the communications subsystem may unpackage the response, and any information sent with the response, and send the response to the channelizer. At step 260, the channelizer may package the response and send it to the chat engine through the appropriate channel such that the response from the API is communicated to the avatar on the predefined chat channel.

Understandably, by allowing a single automated avatar to utilize a plurality of chat channels, and by associating an API to one or more of the chat channels, the automated avatar may maintain the context of a number of communications at one time. Beneficially this engages avatars participating in a VU and reduces the number of automated avatars needed to communicate with avatars within the VU.

Exemplary Embodiments

Figure 3:
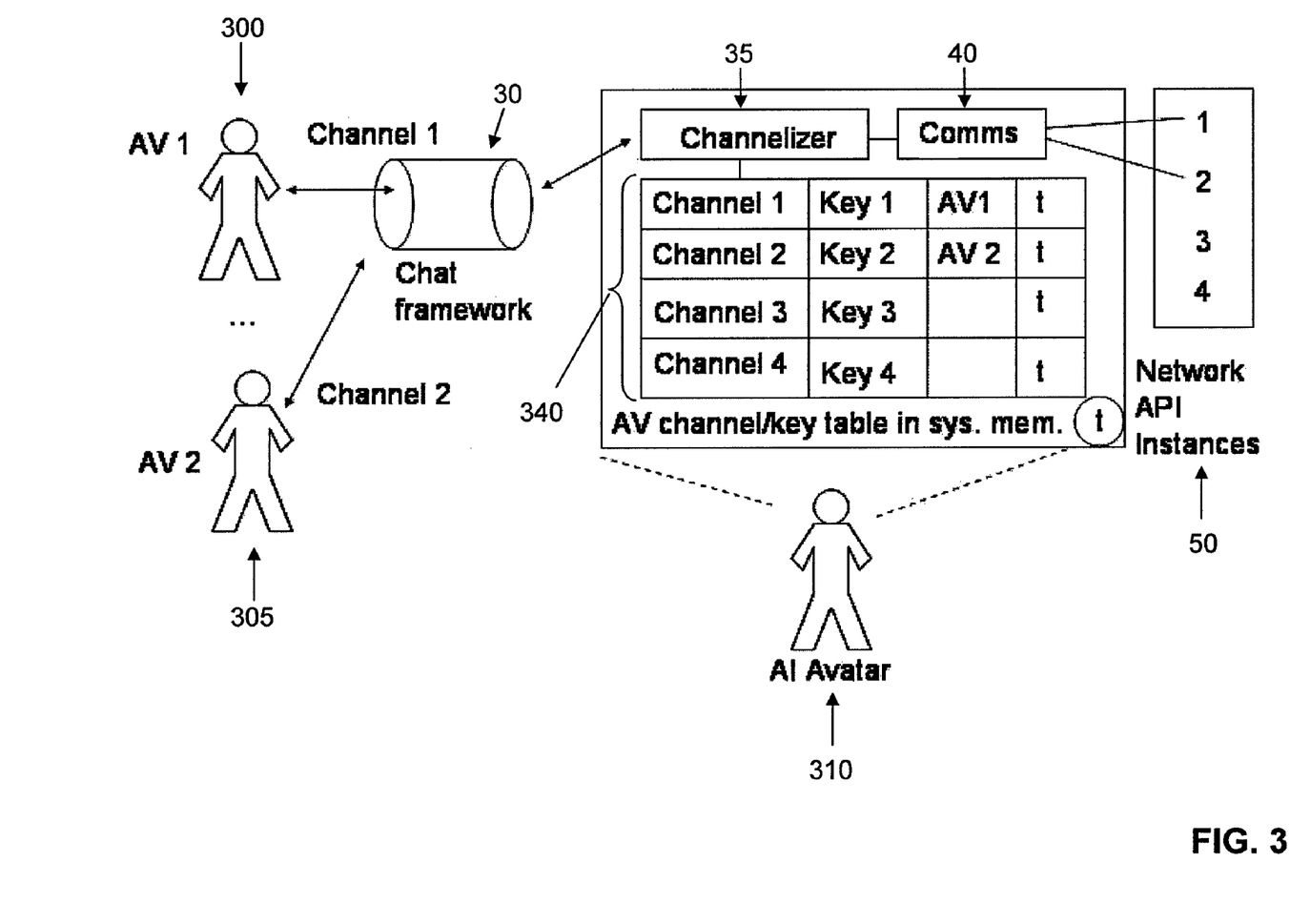
FIG. 3 shows an exemplary embodiment in accordance with aspects of the invention.

FIG. 3 shows an exemplary embodiment according to the invention. In particular, FIG. 3 includes avatars 300 and 305, which may be user avatars, automated avatars, etc. FIG. 3 also includes an automated avatar 310 configured to intelligently communicate with one or more avatars 300 and 305 at a time while maintaining the context of each communication.

For example, a first avatar 300 may come within a certain proximity of a virtual kiosk. The avatar 300 may initiate a communication by saying "hello" to the automated avatar 310 at the virtual kiosk. In embodiments, the initial communication may be sent on a public chat channel using a chat engine or chat framework 30.

The chat framework 30 may use a handler to encode the communication and send the communication to the automated avatar 310 as part of an HTTP request. The automated avatar 310 may recognize the communication and or presence of the avatar 300 via a simulator (such as the simulator 55 in FIG. 1). For example, the automated avatar 310 may utilize a sensor within the simulator to recognize that the avatar 300 is within a specified proximity of the automated avatar 310. Similarly, the automated avatar 310 may utilize a chat facility within the simulator to recognize that the avatar 300 is communicating on a specific channel.

The automated avatar 310 may receive the HTTP request from the chat framework 30 via a channelizer 35. The channelizer 35 may unpackage the HTTP request and determine information about the avatar 300. Exemplary information may include the avatar's name, a channel identifier, and/or a key, etc. The channelizer 35 may lookup one or more of these pieces of information in a chat bank, which may be stored as a lookup table 340 in a system memory (such as memory 22A in FIG. 1). The chat bank may be preconfigured and have predefined chat channels. In embodiments, the chat bank may be assigned prior to the start of the application or API. However, in embodiments, the chat bank may be configured dynamically.

If the information in the received HTTP request matches an entry in the lookup table 340, the channel corresponding to the entry may be used for communicating between the avatar 300 and the automated avatar 310. However, if there is no match, i.e., the communication is the first communication between the avatar 300 and the automated avatar 310, a new channel and table entry may be allocated in the system memory and may be mapped or otherwise assigned to the communication via the channelizer. Once assigned, additional information relating to the communication and/or avatar 300 may be added to the lookup table 340 for future reference. In embodiments, this information will remain in the lookup table 340 until it lapses.

For illustrative purposes, an exemplary lookup table 340 is displayed in FIG. 3. The lookup table 340 includes, e.g., an avatar 300 named "AV1" that has a UUID "key 1", and is communicating on "channel 1". The last communication that was received and/or sent to "AV1" was at time "t". In addition to information existing on existing communications, the lookup table 340 may also comprise a number of chat channels that are available, i.e., not currently being used for communication.

Upon using the lookup table to identify the appropriate channel, the automated avatar 310 may send a communication to the avatar 300 on the identified channel. In embodiments, the communication may be automatic, such as saying "hello". Alternatively, in embodiments, the communication may be determined using one or more artificially intelligent programs. For example, the channelizer 35 may send the unpackaged information to a communications subsystem 40, which may be embodied as part of the automated avatar 310. The communications subsystem 40 may package the communication as part of a HTTP request and send it to an API on a network. In embodiments, the HTTP request may be the same or different than the HTTP request that was sent from the chat framework 30 to the channelizer 35. For example, the HTTP request being sent to the API may include information on the communication channel being used for the communication and may avoid unneeded or duplicative information that may be found, e.g., in the header.

The API may receive the HTTP request and determine what API instance is associated with the communication session. For example, API instance "1" may be associated with the avatar's communication on channel 1. In embodiments, a single API instance may be assigned to each communication, thereby allowing the context of the communication to be easily kept between the avatar 300 and the automated avatar 310. However, embodiments may also group together avatars that are communicating on the same channel provided that the context of the communication can be maintained.

The API instance may determine an appropriate response given the context of the communication and send the response to the communications subsystem over the same or a different network as a packaged HTTP request. The communications subsystem 40 may unpackage the HTTP request and send it to the channelizer 35, which identifies the proper communication channel on which to send the response. In embodiments, the communications subsystem may also create a HTTP request package comprising the response and may send the HTTP request package to the chat framework, which may in turn relay the automated avatar's 310 response to the avatar 300.

While the above example has been described in terms of a single avatar 300 communicating with an automated avatar 310, it should be understood that a similar process may be used when more than one avatar 300 and 305 is communicating with the automated avatar 310. For example, a second avatar 305 may initiate a communication with the automated avatar 310. The communication may be sent from the chat framework to the channelizer, as described above. The channelizer may determine whether the communication has already been assigned to the communication or whether a new channel need be assigned to the communication. Once a channel is assigned, the communication may be relayed to an API instance 50 via the communications subsystem 40. The API instance 50 may determine the appropriate response given the context of the communication and send the response back to the communications subsystem 40, which may send the response to the avatar 305 via an appropriate channel as determined by the channelizer 35.

It should be understood that the communications between one or more avatars 300 and 305 and the automated avatar 310 may occur simultaneously or at different times. Thus, for example, a single automated avatar 310 may communicate with any number of avatars 300 and 305 at the same time while maintaining the context of each communication.

Accordingly, as described herein, the present invention comprises parallel concurrent channels for communication and also provides stateful interactions with parallel instances of network APIs that provide some service by returning data to the avatar based on an input request. In particular, the present invention comprises an initial interaction pattern which recognizes an avatar and assigns a channel to a communication with the avatar. The invention also provides a state management algorithm that maps avatar instances to stateful API instances in the back-end applications. Beneficially this allows the context of interactions, e.g., communications, between avatars and automated avatars to be maintained.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if applicable, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system, comprising:
   a computing device comprising:
     a chat engine;
     a communications subsystem; and
     a channelizer configured to:
       mediate one or more communications between the chat engine and the communications subsystem;
       determine whether the one or more communications are new communications or preexisting communications;
       map at least one channel to the one or more communications based on whether the one or more communications are the new communications or the preexisting communications;
       add information in the one or more communications to a lookup table, the information comprising at least one of the at least one channel, a key, a username, and a time;
       track a time at which the one or more communications took place;
       remove the information in the one or more communications from the lookup table after a predetermined period of time has elapsed;
       transmit the one or more communications to an application; and
       transmit a response to the one or more communications from the application to an avatar through the mapped at least one channel,
       wherein the at least one channel is determined based on whether the information in the one or more communications matches the information in the lookup table.

2. The system of claim 1, wherein the communications subsystem includes a simulator, which comprises at least one of a sensor, a chat facility, and an interpreter.

3. The system of claim 1, wherein the application is an instance of an application program interface.

4. The system of claim 1, wherein the application includes one or more artificially intelligent programs configured to provide a response to the one or more communications while maintaining a context of the one or more communications.

5. The system of claim 1, wherein the key is a universally unique identifier.

6. The system of claim 1, wherein the one or more communications occur between an automated avatar and one or more of a user avatar or another automated avatar.

7. The system of claim 6, wherein the one or more communications occurs between a single automated avatar and a plurality of user avatars or other automated avatars, and a context of the one or more communications is maintained.

8. A computer implemented method comprising:
   receiving a communication from an avatar over a chat framework;
   determining whether the communication is a new communication or a preexisting communication;
   mapping the communication to a channel based on whether the communication is the new communication or the preexisting communication;
   adding information in the communication to a lookup table, the information comprising at least one of the channel, a key, a username, and a time;
   tracking a time at which the communication took place;
   removing the information in the communication from the lookup table after a predetermined period of time has elapsed; and
   transmitting a response to the communication over the chat framework on the channel, wherein the response maintains a context of the communication,
   wherein the determining includes determining whether the information in the communication matches the information in the lookup table.

9. The computer implemented method of claim 8, wherein the receiving and the transmitting includes a hypertext transfer protocol (HTTP) message.

10. The computer implemented method of claim 8, further comprising determining whether a received communication is a first communication or part of an existing communication.

11. The computer implemented method of claim 8, wherein the steps are implemented on a combination of software, hardware, or software and hardware.

12. The computer implemented method of claim 8, wherein the steps are offered by a service provider based on one of a fee, advertising, and subscription basis.

13. The computer implemented method of claim 8, wherein the computer implemented method is at least one of: supported, deployed, maintained, and created by a service provider.

14. The computer implemented method of claim 8, further comprising adding an entry to the lookup table when the communication is the new communication.

15. A computer program product comprising a computer usable storage memory having readable program code embodied in the storage memory, the computer program product includes at least one component operable to:

identify an incoming communication;
determine whether the incoming communication is a new communication or a preexisting communication;
map the incoming communication to a channel based on the checking;
add information about the incoming communication to a lookup table, the information comprising at least one of the channel, a key, a username, and a time;
track a time at which the incoming communication took place;
remove the information from the lookup table after a predetermined period of time has elapsed;
send the incoming communication to an application program interface;
receive a communication from the application program interface; and
transmit the communication from the application program interface to an avatar through the mapped channel,
wherein the communication is a response in a context of the incoming communication, and
wherein the determining includes determining whether the information in the incoming communication matches the information in the lookup table.

16. The computer program product of claim 15, further comprising at least one component operable to sense the avatar within a proximity of an automated avatar.

17. The computer program product of claim 15, further comprising at least one component operable to sense the avatar communicating on the channel.

18. The computer program product of claim 15, wherein the computer program product is at least one of supported, deployed, maintained, and created by a service provider.

19. The computer program product of claim 15, being offered by a service provider based on one of a fee, advertising, and subscription basis.

20. The computer program product of claim 15, further comprising at least one component operable to allow multiple avatars to communication on the channel.

21. A method for deploying an application for providing context for interactions, comprising:
providing a computer infrastructure being operable to:
identify an incoming communication from an avatar;
check whether the incoming communication is a new communication or a preexisting communication;
map the incoming communication to a channel based on the checking, the channel being determined based on whether information in the incoming communication matches information in a lookup table, the information in the incoming communication comprising at least one channel of the incoming communication, a key of the avatar, a username of the avatar, and a time of the incoming communication;
send the incoming communication to an application program interface;
receive a response from the application program interface, wherein the response is in a context of the incoming communication;
add the information in the incoming communication to the lookup table;
track the time at which the incoming communication took place;
remove the information in the incoming communication from the lookup table after a predetermined period of time has elapsed; and
transmit the response from the application program interface to the avatar through the mapped channel.

22. The method of claim 21, wherein the computer infrastructure is at least one of supported, deployed, maintained, and created by a service provider.

\* \* \* \* \*